Oct. 14, 1969
JAMES E. WEBB
ADMINISTRATOR OF THE NATIONAL AERONAUTICS
AND SPACE ADMINISTRATION
PROPELLENT MASS DISTRIBUTION METERING APPARATUS
Filed April 24, 1968
3,472,080
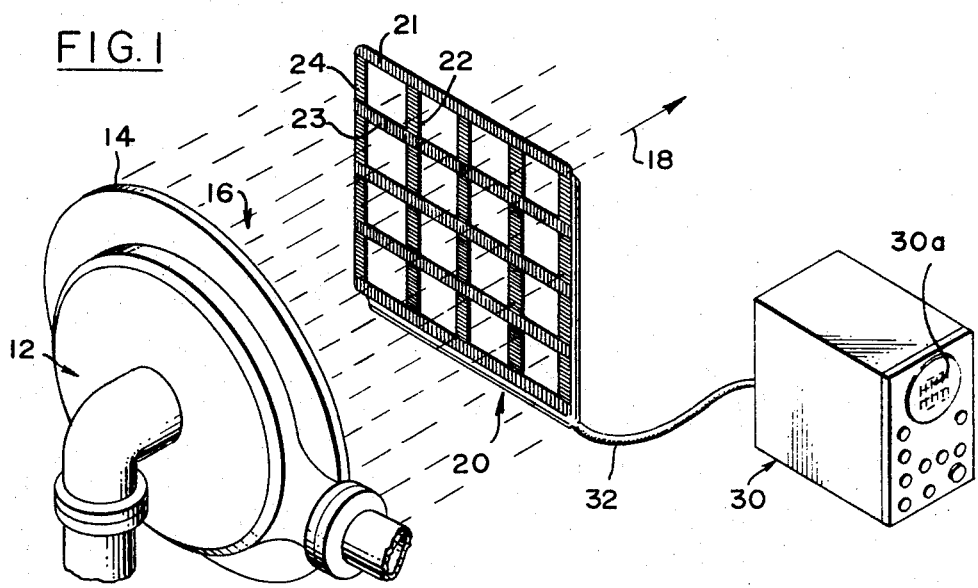
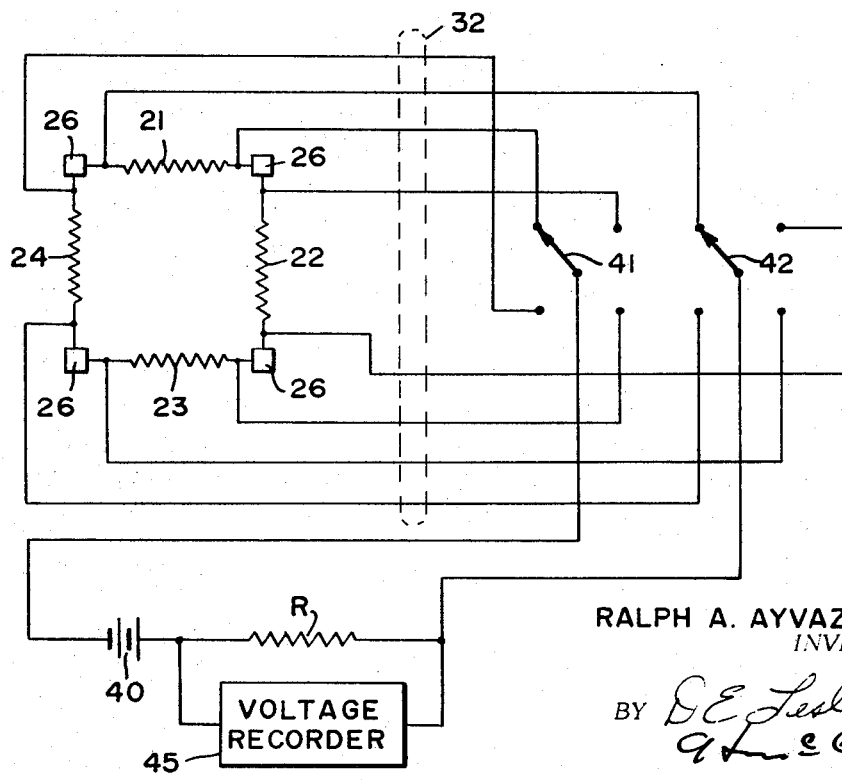
RALPH A. AYVAZIAN
INVENTOR.
BY D E Leslie
ATTORNEYS

United States Patent Office 3,472,080
Patented Oct. 14, 1969

---

3,472,080
PROPELLENT MASS DISTRIBUTION METERING APPARATUS
James E. Webb, Administrator of the National Aeronautics and Space Administration, with respect to an invention of Ralph A. Ayvazian, Canoga Park, Calif.
Filed Apr. 24, 1968, Ser. No. 723,805
Int. Cl. G01f *11/00, 23/00*
U.S. Cl. 73—432
8 Claims

ABSTRACT OF THE DISCLOSURE

An apparatus for metering or recording the spatial distribution of propellent matter, such as droplets or vapor in a stream which is ejected from an injector or nozzle. The apparatus consists of a grid with electrical high resistance screen elements, interconnected at insulating nodal member to form a preselected array or matrix. To meter or record the spatial mass distribution, the grid is placed in the stream's path and an external power supply and readout device are selectively connected across each resistance element to record changes in its electrical resistance as a function of droplets or vapor impinging thereon.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention generally relates to an electrical apparatus and, more particularly, to an electrical apparatus for metering or recording the spatial distribution of matter.

Description of the prior art

It is often desirable or necessary to determine the dispersion or spatial distribution of droplets or vapor which are ejected, as part of a high velocity stream, from an injector or nozzle. Such a determination is necessary, for example, in the development of injectors for liquid propellent engines, which operate properly only when a liquid fuel and a liquid oxidizer, ejected from separate nozzles or injectors, are uniformly mixed to produce a desired combustion. Performance of the nozzles or injectors is generally determined before actual hot firings by investigating the spatial distribution of matter ejected therethrough.

Herebefore, cumbersome and relatively inefficient techniques were employed to determine the spatial distribution of matter ejected from such devices. In one technique, which has been employed, a plurality of rain gauges are placed in the stream path. The matter trapped by the various gauges is separately analyzed and charted to provide a spatial distribution indication. Such a technique is quite slow and therefore, time consuming. Also, the rain gauges themselves disturb the spatial distribution of matter, so that the results are of limited accuracy. Therefore, the technique itself is of limited use, especially when precise information of the spatial distribution of matter is required.

OBJECTS AND SUMMARY OF THE INVENTION

It is a primary object of the present invention to provide a new improved apparatus for recording the spatial distribution of matter in high velocity streams as produced, for example, in a rocket engine liquid injector.

Another object of the present invention is the provision of a relatively simple electrical apparatus with which the spatial distribution of matter directed along selected paths is easily and accurately determinable.

A further object of the present invention is to provide an easily constructable and operable apparatus for the investigation of spatial distribution of droplets or vapor in high velocity streams.

Still a further object is the provision of a reliable, electrical apparatus for metering or recording, with a relatively high degree of accuracy, the spatial distribution of droplets or vapor in high velocity streams ejected from nozzles or orifices.

These and other objects are achieved by providing an apparatus which consists of a grid, composed of a plurality of electrical resistive elements, arranged in a fixed geometric planar pattern or array. The elements are carefully insulated from each other and from their support structure. An electrical lead is connected to each end of each element and to a grid scanning device, by means of which the resistance of each element can be monitored, recorded or measured. In the absence of droplets or vapor impinging on any of the elements, each element has substantially the same electical resistance.

To investigate the spatial distribution of droplets or vapor in high velocity streams, the grid is positioned in the stream, perpendicular to its path or direction. The spatial distribution is determined by sequentially measuring or scanning the resistance changes of the various elements, produced by the droplets or vapor impinging thereon.

The novel features of the invention are set forth with particularity in the appended claims. The invention will best be understood from the following description when read in conjunction with the accompanying drawings.

BRIEF DESCRIPTION OF THE DRAWINGS

FIGURE 1 is an isometric view of the apparatus of the present invention shown positioned in the path of a stream whose spatial mass distribution is to be determined; and FIGURE 2 is a partial schematic diagram of the apparatus of the present invention.

DESCRIPTION OF THE PREFERRED EMBODIMENTS

Referring to FIGURE 1, therein numeral 12 designates an injector, which is assumed to define a nozzle 14 through which streams of matter 16 are ejected in a direction or path designated by arrow 18.

To monitor or record the spatial distribution of matter in the stream 16, the apparatus of the present invention includes a planar multielement grid 20, which is disposed in a plane perpendicular to the stream direction. The grid 20 consists of a plurality of preferably identical electrical resistive elements, which are arranged in a symmetrical geometric pattern. The number of elements which are used and the particular geometric pattern in which they are arranged depend on the size of the stream, i.e., the stream diameter and the desired resolution of the spatial distribution. In FIGURE 1, the grid 20 is shown consisting of twenty horizontally disposed and twenty vertically disposed resistive elements. Only the four elements of the grid's upper left-hand corner are designated by numerals 21–24. An expanded view of the four elements is shown in FIGURE 2 to which reference is made herein.

Each grid element has a relatively high electrical resistance and is preferably of low cross-sectional area, so that a large number of elements can fit into a relatively small matrix. The element should preferably be in the form of a fine screen to define a maximum surface. This is desirable to produce maximum resistance change as matter, such as droplets or vapor, comes in contact with the element. Fine Nichrome screen is one example of a material which can be used to form the various elements.

The elements are preferably insulated from each other with insulators 26 (see FIGURE 2) and from their support structure. Electrical leads connect each of the elements to a power supply and recorder unit, designated in FIGURE 1 by numeral 30. The electrical leads which connect the various elements to unit 30 are represented in FIGURE 1 by a multilead cable 32.

Briefly, the spatial distribution of matter in stream 16 is determined by the matter impinging on, or adjacent each element, as a function of the change in resistance thereof. It is apparent that the change in resistance may be sensed with any one of several techniques and with any desired degree of accuracy. Also, the manner in which the determined change in resistance is recorded or monitored would of course depend on the purpose of the investigation and the intended use of the results.

One simple example of an embodiment of the power supply and recorder unit 30 is shown in FIGURE 2. The unit includes a power supply, such as a battery 40, connected in series with a resistor R. A pair of ganged multiposition switches 41 and 42 are used as commutators to sequentially connect the battery 40 and the resistor R across each of the elements. To scan all the forty elements of grid 20, two, 40 position switches are required. For explanatory purposes, however, the two switches shown in FIGURE 2 are shown with only four positions, required to scan the four elements 21–24.

Assuming that the voltage of battery 40 is V and the resistance of each element, in the absence of matter impinging thereon is $R_E$, the voltage across R as recorded by recorder 45 is $$V_R = \frac{V}{R + R_E} \cdot R$$

Any change, generally an increase, in the voltage across R which is recorded when the switches 41 and 42 connect the resistor R and battery 40 across an element is directly related to the decrease in the element's resistance which is in turn a function of the matter flowing thereby. Thus, by recording the voltage across R as each element is scanned, a clear and accurate indication is provided of the spatial mass distribution in the stream of matter 16.

The voltages recorded in recorder 45 may also be recorded on a tape for computer processing, or they may be used directly to control a display device, such as a cathode ray tube 30a (see FIGURE 1), which may be part of unit 30. Indeed, the tube 30a may include a relatively long-persistance display surface, so that a complete visual display related to the spatial mass distribution in the stream may be produced thereon.

From the foregoing, it should be apparent that the apparatus of the present invention may be as simple or as complex as its specific use dictates. A grid of few elements may be sufficient to determine gross mass distribution, while a grid with a very large number of elements is justified to provide signals for a very critical evaluation of the mass distribution of the stream, produced by a complex nozzle or injector unit. Also, the manner in which the signals are processed and/or displayed would depend on their specific usage.

What is claimed is:
1. An apparatus for determining the distribution of particles in a stream of particles directed along a fixed axis, comprising:
   a planar grid perpendicularly positioned with respect to said fixed axis, said grid comprising a plurality of grid elements arranged in a preselected pattern, each element exhibiting a selected substantially identical physical property; and
   means connected to said grid elements for selectively measuring the physical property of each of said elements to detect changes therein as a function of the particles in said stream adjacent the grid element.
2. The apparatus as recited in claim 1 wherein each grid element has preselected electrical resistance at known environmental conditions.
3. The apparatus as recited in claim 1 wherein said means include commutating means successively coupled to a selected one of said elements to measure the physical property thereacross, and means for recording the measured physical property of each element.
4. The apparatus as recited in claim 3 wherein said means for recording include a two-dimensional display surface for simultaneously displaying thereon signals which are related to the measured physical properties of said grid elements, to thereby display the relative distribution of particles in said stream.
5. The apparatus as recited in claim 4 wherein each grid element has a selected fixed electrical resistance at known environmental conditions.
6. For use in combination with an injector, an apparatus for monitoring the mass distribution in a stream of matter of the type ejected from said injector at a discharge plane thereat comprising:
   a multielement grid positioned parallel to the discharge plane of said injector and downstream thereof, each element exhibiting a selected physical property at known environmental conditions in the absence of said stream of matter; and
   monitoring means coupled to said grid for selectively monitoring the physical property of each element as affected by the mass of matter streaming adjacent thereto.
7. The apparatus as recited in claim 6 wherein said grid consists of interconnected electrical resistive elements, and said monitoring means comprises means for monitoring the electrical resistance of each element as affected by the matter streaming thereby.
8. The apparatus as recited in claim 7 wherein said monitoring means include means for sequentially sampling the resistance across each element and for displaying a pattern corresponding to the resistances of the various elements.

References Cited
UNITED STATES PATENTS

| | | | |
|---|---|---|---|
| 1,240,797 | 9/1917 | Tatum | 73—204 |
| 2,702,471 | 2/1955 | Vonnegut | 73—432 X |
| 3,023,623 | 3/1962 | Lang et al. | 73—432 |

S. CLEMENT SWISHER, Primary Examiner

U.S. Cl. X.R.

73—28, 204